(12) United States Patent
Bogia

(10) Patent No.: US 7,499,987 B2
(45) Date of Patent: Mar. 3, 2009

(54) DETERMINISTICALLY ELECTING AN ACTIVE NODE

(75) Inventor: Douglas Bogia, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1231 days.

(21) Appl. No.: 10/668,717

(22) Filed: Sep. 23, 2003

(65) Prior Publication Data

US 2005/0066017 A1    Mar. 24, 2005

(51) Int. Cl.
G06F 15/177    (2006.01)

(52) U.S. Cl. .................. 709/221; 709/220; 709/222

(58) Field of Classification Search .............. 709/220, 709/221, 222
See application file for complete search history.

(56) References Cited

U.S. PATENT DOCUMENTS 6,598,080 B1 * 7/2003 Nagami et al. ............ 709/227
6,665,675 B1 * 12/2003 Mitaru ....................... 707/10
2002/0080783 A1 * 6/2002 Fujimori ................... 370/384

* cited by examiner

*Primary Examiner*—Moustafa M Meky
*Assistant Examiner*—Avi Gold
(74) *Attorney, Agent, or Firm*—Buckley, Maschoff & Talwalkar LLC

(57) ABSTRACT

Methods, apparatuses, and systems for deterministically electing an active node. The methods, apparatuses, and systems include a node retrieving active processor information from a shared storage node, becoming active if the active processor information indicates the retrieving node, attempting to communicate with a second node indicated by the active processor information if the active processor information does not indicate the retrieving node, and the retrieving node becoming active if the second node does not communicate with the retrieving node.

9 Claims, 3 Drawing Sheets

IPMI Network

DETERMINISTICALLY ELECTING AN ACTIVE NODE

BACKGROUND

Server management provides tools for management of multiple integrated servers. A server management system may include software or firmware that manages operation of those servers, performs administrative tasks, and provides remote troubleshooting ability. Such server management has been implemented utilizing Intelligent Platform Management (IPMI), which is a standard that provides interconnection between servers. IPMI may furthermore utilize multiple chassis management modules to manage operation of the integrated servers. One chassis management module may operate as an active chassis management module while one or more other chassis management modules may operate as standby chassis management modules. The standby chassis management modules may take the place of the active chassis management module if the active chassis management module is removed or fails. It is desirable, however, to minimize flip-flopping or alternation of active chassis management module between two or more operational chassis management modules.

BRIEF DESCRIPTION OF THE DRAWINGS

The accompanying drawings, wherein like reference numerals are employed to designate like components, are included to provide a further understanding of deterministic chassis management module selection, are incorporated in and constitute a part of this specification, and illustrate embodiments of deterministic chassis management module selection that together with the description serve to explain the principles thereof.

In the drawings.

DETAILED DESCRIPTION

Figure 1:
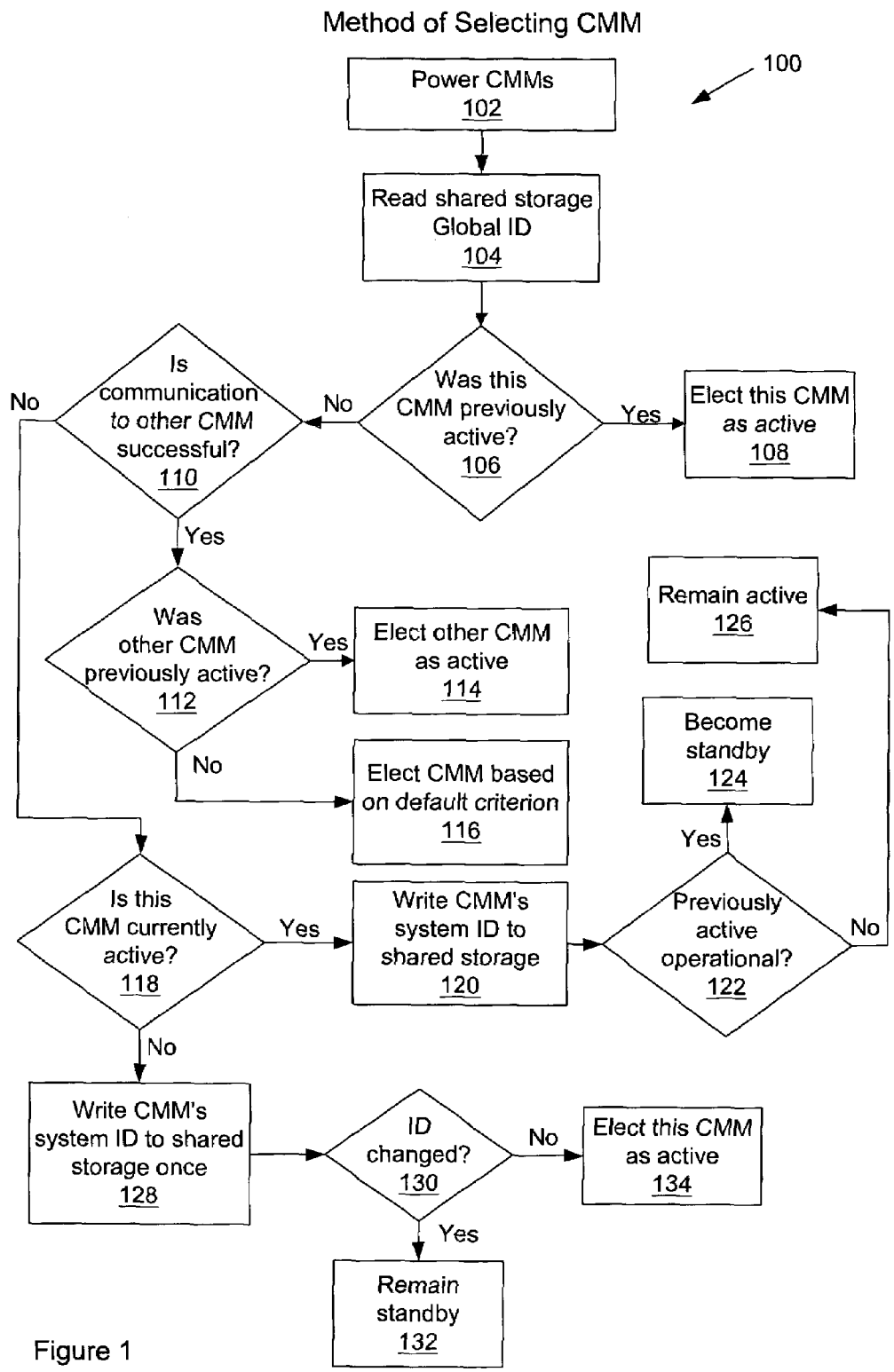
FIG. 1 is a block diagram of an embodiment of a method of deterministic chassis management module selection.

Reference will now be made to embodiments of deterministic election of a node, examples of which are illustrated in the accompanying drawings. Moreover, those of ordinary skill in the art will appreciate that the deterministic election of a node described in connection with a chassis management module may be applicable to other systems having redundant nodes. Other details, features, and advantages of deterministic election of a node will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment. The appearances of such terms in various places in the specification are not necessarily all referring to the same embodiment. References to "or" are furthermore intended as inclusive so "or" may indicate one or another of the ored terms or more than one ored term.

A current version of Intelligent Platform Management Interface (IPMI) consists of three specifications: a specification for the IPMI, a specification for an Intelligent Platform Management Bus (IPMB) that may be utilized with the IPMI and a specification for an Intelligent Chassis Management Bus (ICMB) that may also be utilized with the IPMI. Those specifications are available at developer.intel.com/design/servers/ipmi/spec, as IPMI Specification version 1.5, Document revision 1.1, which was published Feb. 20, 2002.

The IPMI specification defines the messages and system interfaces to platform management hardware. The IPMI standard further defines common commands, data structures, and message formats for interfaces in IPMI. IPMI also defines common management functions such as how a System Event Log and Sensor Data Records are managed and accessed, how the system interfaces work, how sensors operate, how control functions such as system power on/off and reset are initiated, and how the IPMI host system watchdog timer function operates.

The IPMB specification defines an internal management bus for extending platform management within a chassis. The IPMB typically is used to link chassis management features with a motherboard management subsystem. The IPMB Address specification specifies how devices are allocated addresses on an IPMB.

A certain IPMB is based on a 2-wire serial bus that provides a standardized interconnection between different devices, or boards, or blades within a chassis. The IPMB may also serve as a standardized interface for auxiliary devices.

The ICMB specification defines an external management bus between multiple host systems and peripheral chassis.

IPMI defines common interfaces to certain hardware that is used to monitor server physical characteristics, such as temperature, voltage, fan operation, power supply operation, and chassis integrity. Those monitoring abilities provide information that enables system management, failure recovery, and device monitoring. Management features may include, for example, automatic alerting, automatic system shutdown and restart, remote restart, and power control. Such abilities and flexibility have furthermore been found to result in lower cost of operation and more convenient operation.

IPMI may specify common, abstracted, message-based interfaces to a management micro-controller. That in turn may permit the isolation of software from hardware. IPMI may also specify commands and sensor data records that describe the number and type of monitoring and control capabilities of a platform. That allows software to discover and automatically adapt to the monitoring and control features of the platform.

Server Management may provide capabilities for server management including, for example, high availability infrastructure that aims to keep a system operational at all times, often through backup and failover processing and data storage and access; electronic keying that may require replacement of a device with another device of the same series or revision to permit the device to work on a network; network provisioning systems that may provide customer services, log transactions, carry out requests, and update files; fault tolerance; failure analysis; trending; and deployment of operating systems and software.

Chassis management modules are nodes that may manage node operation in IPMI. It may also be desirable to have redundant nodes to perform such high level management. Thus, it may be necessary to select which of two or more chassis management modules are to act as an active chassis management module and which are to operate as standby chassis management modules. One or more shared storage nodes may also be coupled to the IPMI and may maintain information related to selection of an active chassis management module.

Each chassis management module may have a system identifier such as, for example, a hardware address or an internet protocol address (IP address).

At power-up, an active chassis management module may be selected randomly or, for example, on the basis of an identifier of those communicating chassis management modules with the idea that an initial active chassis management module should be selected as soon as possible at power-up and a more appropriate active chassis management module may be selected within a short period of time thereafter.

Determination of a long-term active chassis management module may be based, at least in part, on the state of each chassis management module when that chassis management module was last energized. Various power-on or energization stages or modes may exist with chassis management modules. In one such mode, two or more chassis management modules are energized and become operational nearly simultaneously. In such a mode, an active chassis management module may be selected from the various operational chassis management modules with minimal switching of active chassis management module between the operational chassis management modules.

In another mode, one or more chassis management modules is delayed in being powered or delayed in becoming operational due to, for example, a firmware upgrade. In such a mode, a predetermined time period may be permitted to pass before selecting a chassis management module to be active long-term, and after that predetermined time period a long-term active chassis management module is selected from those chassis management modules that are available.

In yet another mode, a chassis management module may be swapped or removed with another chassis management module put in its place during a period when the various chassis management modules are de-energized. In such a mode, if the chassis management module that was swapped was not active at the time it was de-energized, no change need be made to the active chassis management module at power-up, whereas if the chassis management module that was swapped was the active chassis management module at the time when it was de-energized, then a standby chassis management module may be selected to become the active chassis management module at power-up.

When a chassis management module fails, if the failed chassis management module is not active, no change need be made to the active chassis management module, whereas if the failed chassis management module is the active chassis management module, then a standby chassis management module may be selected to become the active chassis management module.

In an embodiment, the systems, apparatuses and methods described will operate to minimize alternation of the active chassis management module between two or more chassis management modules when those chassis management modules are energized. In those systems, apparatuses and methods, if the chassis management module that was active when the chassis management modules were de-energized (the previously or last active chassis management module) is operational, that previously active chassis management module will resume as active chassis management module when re-energized. If the previously active chassis management module is not operational and only one other chassis management module is operational, then the operational chassis management module will become active. If more than one chassis management module is operational, but none of the operational chassis management modules was the previously active chassis management module, then a new active chassis management module will be selected based on some criterion, which may be arbitrary, such as the chassis management module having the lowest globally unique identifier.

In an embodiment, the systems, apparatuses and methods will also prevent the active chassis management module from alternating between two or more operational chassis management modules when direct communication between two or more of those operational chassis management modules is lost.

FIG. 1 illustrates an embodiment of a method deterministic chassis management module selection 100. That method 100 may activate a chassis management module or other node, or select a chassis management module or node to be activated, while minimizing re-activating or re-selecting of various chassis management modules or nodes available for activation. At 102, one or more chassis management modules are energized. After the chassis management modules are energized, hardware may be available to determine the presence of chassis management modules and report that information to operational chassis management modules. If such hardware is available and only one chassis management module is present, then that chassis management module may be immediately selected to be active.

At 104, information may be retrieved from an active node record in the shared storage node by any energized chassis management modules. That information related to the chassis management module or modules may be read from a shared storage node coupled to a network communicating with the chassis management modules and the network may be arranged so that if a communication fault occurs between the chassis management modules, communication between the chassis management modules and the shared storage node may remain operational. That information retrieved from the shared storage node may include an identifier of the chassis management module that was most recently active. Chassis management module global identifiers may be stored in various formats including a globally unique hardware identifier (such as a serial number). The Internet Protocol (IP) is defined by the Internet Engineering Task Force (IETF) standard 5, Request for Comment (RFC) 791 (referred to as the "IP Specification"), adopted in September, 1981 and available from www.ietf.org.

If the information in the shared storage node may not be accessed, then the active chassis management module may be selected randomly or based on its address. For example, the chassis management module having the lowest globally or system-wide unique identifier may be selected to be active. One or more additional shared storage nodes may also be utilized to store active chassis management module information and may provide that information to chassis management modules upon request when another shared storage node is unable to provide that information.

At 106, if the chassis management module may communicate with the shared storage node and reads its own identifier as the previously active chassis management module, then the chassis management module may once again become the active chassis management module at 108.

At 110, the chassis management module determines whether it is able to communicate with other chassis management modules. That communication may be, for example, by way of the IPMB and may be by way of a route that is different than the route with which the chassis management module communicated with the shared storage node. As chassis management modules may not all begin to operate simultaneously, repeated attempts to communicate may occur over a predetermined time period before an assumption is made that a non-responding chassis management module has failed.

At 112, if communication with another chassis management module that was previously active is successful, then that previously active chassis management module is elected to be active again at 114. If communication with other chassis management modules is successful, but no operational chassis management module was the previously active chassis management module then one of the operational chassis management modules may be elected to be active at 116. That election may be done arbitrarily or, for example, by electing the chassis management module having the lowest hardware address.

At 118, if the chassis management module is not able to communicate with another chassis management module, because for example there is a failure of a portion of the IPMB, then the chassis management module will determine whether it was selected as active on power-up. As previously discussed, at power-up, an initial active chassis management module may be selected quickly and a more appropriate active chassis management module may be selected within a short period of time thereafter. At 118, if the instant chassis management module was selected to be active at power-up, then at 120, that chassis management module will write its identifier to the shared storage node, indicating that it is the current active node.

At 122, if the previously active chassis management module becomes operational within an initial time limit of, for example, 35 seconds, then that previously active chassis management module may inform the initial active chassis management module that it is taking over as active chassis management module and the initial active chassis management module will become a standby at 124. That informing may occur by, for example, dedicated hardware signals that the CMM wishing to become active can toggle to convert from standby to active. Those hardware signals may also indicate to another CMM that it is no longer active. If the previously active chassis management module does not become operational within the time limit, then the instant chassis management module may write its global ID to shared storage and rewrite its system IDs to the shared storage node periodically, for example, every 15 seconds, to overwrite any other chassis management modules with which it cannot communicate. Then, at 126, after the initial time limit of, for example, 35 seconds, the instant chassis management module will become the active chassis management module.

At 118, if the chassis management module is not able to communicate with another chassis management module and the chassis management module was not selected as active on power-up, then the chassis management module will write its system identifier to the shared storage node at 128 and may perform that write a single time at 128 so that that identifier may be overwritten as described above.

At 130, the chassis management module will check the shared storage node, for example after the initial time limit runs out, and if the identifier in the shared storage node has changed, then the chassis management module will remain a standby at 132, and if the identifier in the shared storage node has not changed, then the chassis management module will become active at 134.

It should be recognized that other chassis management modules that are operational but cannot communicate with the previously active chassis management module may likewise utilize the method of selecting a chassis management module 100. Thus each chassis management module may write their addresses and then wait to determine if another chassis management module overwrites its address, indicating that the overwriting chassis management module is the active chassis management module.

If information is available, for example through dedicated hardware, that indicates that only one chassis management module exists in the chassis, then that one chassis management module may be selected to be active without performing the method of selecting a chassis management module.

An active chassis management module may regularly transmit information to one or more standby chassis management modules so that the standby chassis management modules will contain duplicate information that matches that in the active chassis management module. In that way, the standby chassis management modules can seamlessly become active upon failure or removal of the active chassis management module and have all appropriate information that the previously active chassis management module contained.

Thus, the method for determination of an active chassis management module 100 may reduce competition between chassis management modules and avoid a situation wherein, for example, two chassis management modules each attempt to repeatedly become the active chassis management module.

An article of manufacture that includes a computer readable medium having stored thereon instructions that cause a processor to perform that method for determination of an active chassis management module when those instructions are executed may also be constructed.

Figure 2:
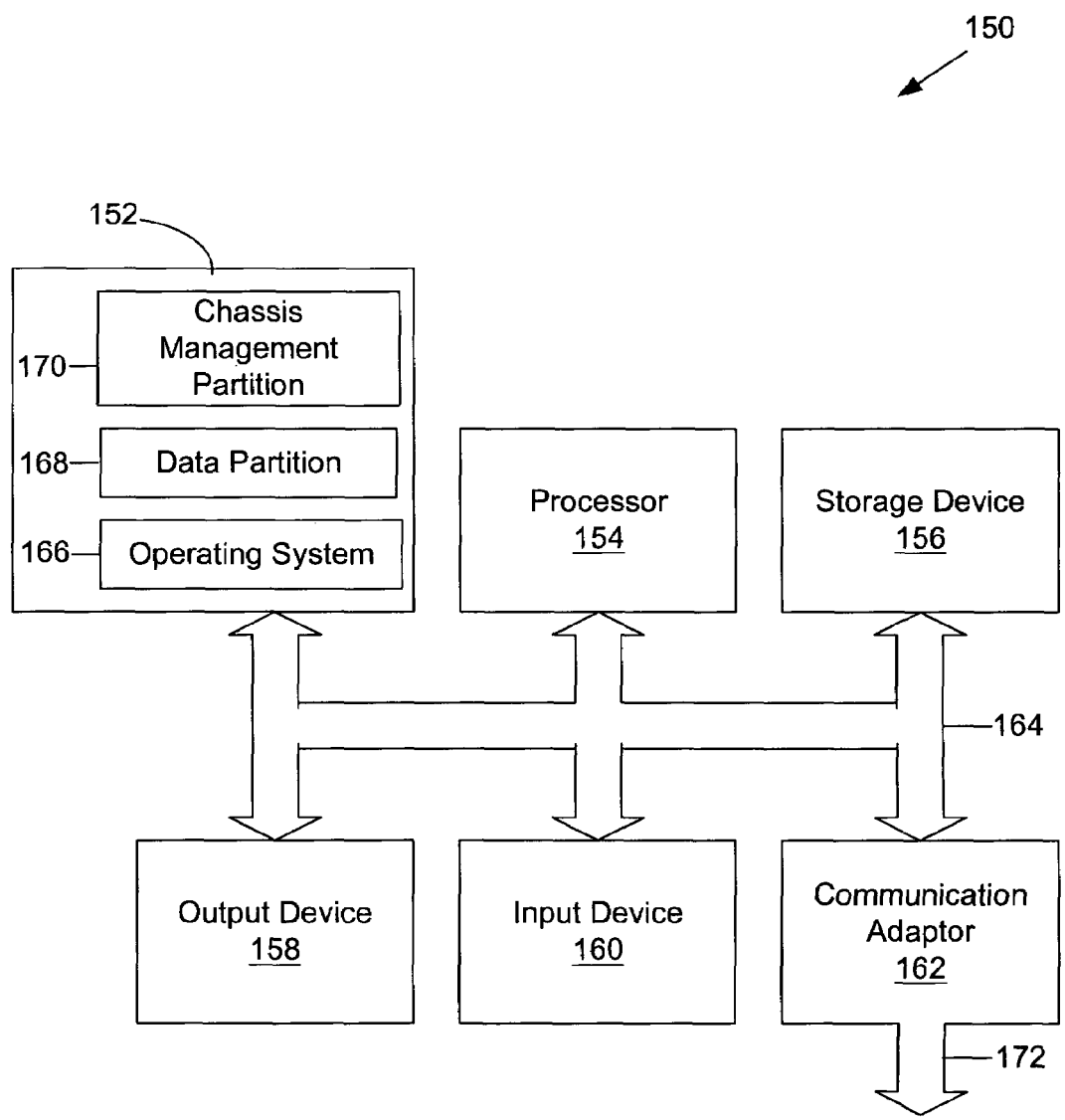
FIG. 2 is an embodiment of a chassis management module.

FIG. 2 illustrates a chassis management module 150. The chassis management module 150 includes memory 152, a processor 154, a storage device 156, an output device 158, an input device 160, and a communication adaptor 162. It should be recognized that any or all of the components 152-162 of the chassis management module 150 may be implemented in a single machine. For example, the memory 152 and processor 154 might be combined in a state machine or other hardware based logic machine.

Communication between the processor 154, the storage device 156, the output device 158, the input device 160, and the communication adaptor 162 may be accomplished by way of one or more communication busses 164. It should be recognized that the chassis management module 150 may have fewer components or more components than shown in FIG. 2. For example, if output devices 158 or input devices 160 are not desired, they may not be included with the chassis management module 150.

The memory 152 may, for example, include random access memory (RAM), dynamic RAM, and/or read only memory (ROM) (e.g., programmable ROM, erasable programmable ROM, or electronically erasable programmable ROM) and may store computer program instructions and information. The memory 152 may furthermore be partitioned into sections including an operating system partition 166, wherein instructions may be stored, a data partition 168 in which data may be stored, and a chassis management partition 170 in which instructions for selection of a chassis management module and stored information related to such a chassis management module may be stored. The chassis management partition 170 may also allow execution by the processor 154 of the instructions stored in the chassis management partition 170. The data partition 168 may furthermore store data to be used during the execution of the program instructions such as, for example, active chassis management information and information related to other nodes in the network.

The processor 154 may execute the program instructions and process the data stored in the memory 152. In one embodiment, the instructions are stored in memory 152 in a compressed and/or encrypted format. As used herein the phrase, "executed by a processor" is intended to encompass instructions stored in a compressed and/or encrypted format, as well as instructions that may be compiled or installed by an installer before being executed by the processor 154.

The storage device 156 may, for example, be a magnetic disk (e.g., floppy disk and hard drive), optical disk (e.g., CD-ROM) or any other device or signal that can store digital information. The communication adaptor 162 may permit communication between the processor based chassis management module 150 and other devices or nodes coupled to the communication adaptor 162 at a communication adaptor port 172. The communication adaptor 162 may be a network interface that transfers information from nodes 201-207 on a network such as the network 200 illustrated in FIG. 3, to the chassis management module 150 or from the chassis management module 150 to nodes 201-207 on the network 200. The network in which the chassis management module 150 operates may alternately be a LAN, WAN, or the Internet. It will be recognized that the chassis management module 150 may alternately or in addition be coupled directly to one or more other devices through one or more input/output adaptors (not shown).

The chassis management module 150 may also be coupled to one or more output devices 158 such as, for example, a monitor or printer, and one or more input devices 160 such as, for example, a keyboard or mouse. It will be recognized, however, that the chassis management module 150 does not necessarily need to have any or all of those output devices 158 or input devices 160 to operate.

The elements 152, 154, 156, 158, 160, and 162 of the chassis management module 150 may communicate by way of one or more communication busses 164. Those busses 164 may include, for example, a system bus, a peripheral component interface bus, and an industry standard architecture bus.

The network in which deterministic chassis management module selection is implemented may be a network of nodes such as computers, dumb terminals, boards or blades in a chassis or other, typically processor-based, devices interconnected by one or more forms of communication media. The communication media coupling those devices may include, for example, twisted pair, co-axial cable, optical fibers and wireless communication methods such as use of radio frequencies.

Network nodes may be equipped with the appropriate hardware, software or firmware necessary to communicate information in accordance with one or more protocols. A protocol may comprise a set of instructions by which the information is communicated over the communications medium. Protocols are, furthermore, often layered over one another to form something called a "protocol stack."

In addition to operating to select a chassis management module, in one embodiment, selection of an active node and a standby node in a network such as an OSI based network may utilize the present method. The OSI architecture includes (1) a physical layer, (2) a data link layer, (3) a network layer, (4) a transport layer, (5) a session layer, (6) a presentation layer, and (7) an application layer.

The physical layer is concerned with electrical and mechanical connections to the network and may, for example, be performed by a token ring or Ethernet bus in a standard OSI architecture. The data link layer arranges data into frames to be sent on the physical layer and may receive frames. The data link layer may receive acknowledgement frames, perform error checking and re-transmit frames not correctly received. The data link may also be performed by the bus handling the physical layer. In the modified OSI architecture, IPMB may perform the physical and data link layer functionality.

The network layer determines routing of packets of data and may be performed by, for example, Internet Protocol (IP). The transport layer establishes and dissolves connections between nodes. The transport layer function is commonly performed by a packet switching protocol referred to as the Transmission Control Protocol (TCP). TCP is defined by the Internet engineering Task Force (IETF) Standard 7, Request for Comment (RFC) 793, adopted in September, 1981 (the "TCP Specification"). The network and transport layers are often referred to collectively as "TCP/IP."

In one embodiment, the network nodes utilize a packet switching protocol referred to as the User Datagram Protocol (UDP) as defined by the Internet Engineering Task Force (IETF) standard 6, Request For Comment (RFC) 768, adopted in August, 1980 (the "UDP Specification") in connection with Internet Protocol (IP). The UDP Specification is also available from "www.ietf.org."

UDP is a network communications protocol that offers lesser services than TCP. For example, UDP may provide port numbers to distinguish different user requests and a checksum to verify that data arrived intact. UDP may, however, not provide sequencing of the packets or retransmission of unreceived packets. After the packets are created in either UDP or TCP, the IP layer prepares the packets for transmission across a network such as the Internet.

The session layer establishes a connection between processes on different nodes and handles security and creation of the session. The presentation layer performs functions such as data compression and format conversion to facilitate systems operating in different nodes. The application layer is concerned with a user view of network data, for example, formatting electronic messages. In certain TCP/IP platforms, the functionality of the session layer, the presentation layer, and the application layer are all performed by the application.

Figure 3:
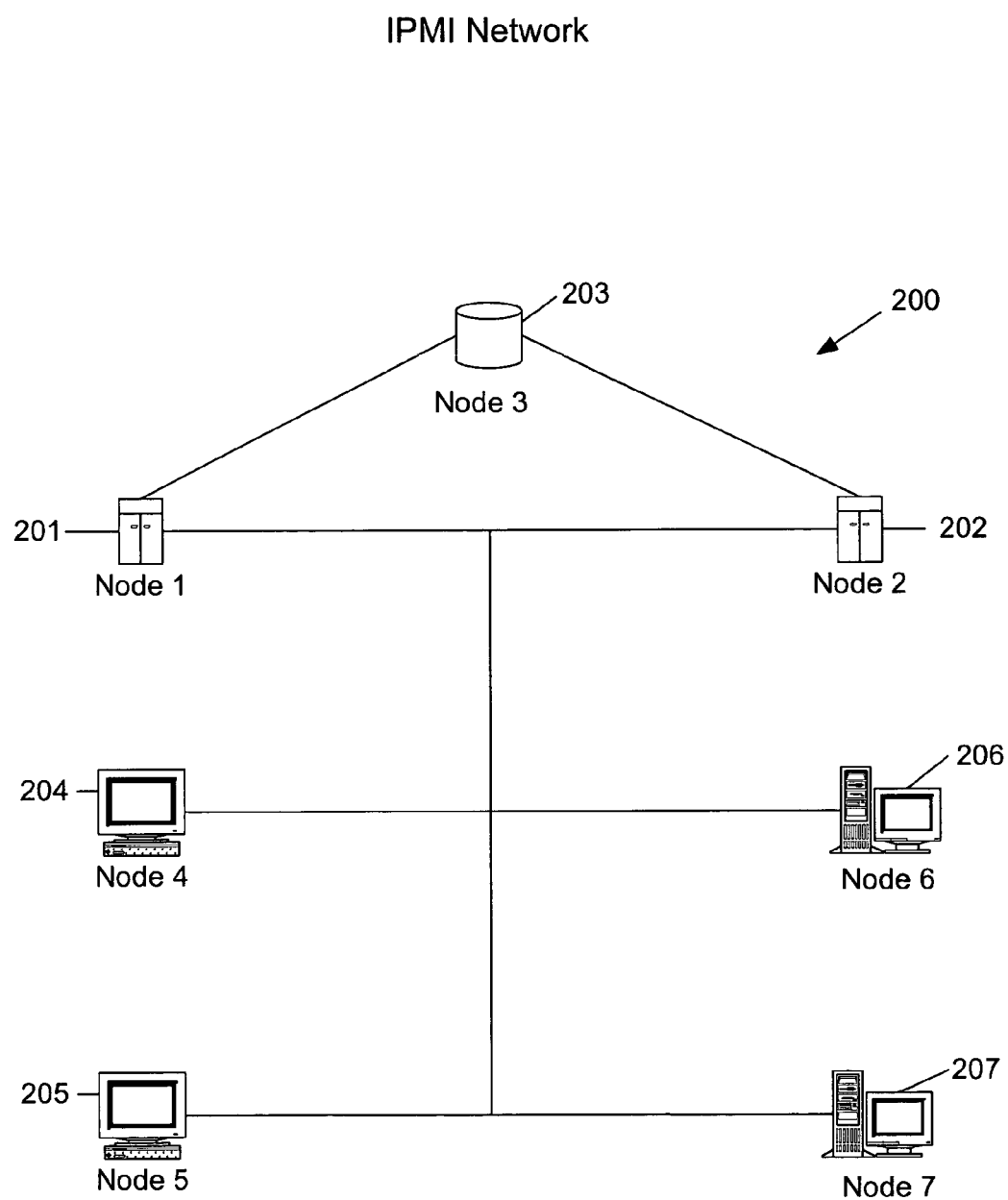
FIG. 3 is an embodiment of an IPMI network in which an embodiment of deterministic chassis management module selection may be implemented.

FIG. 3 illustrates an IPMI network 200 in which deterministic selection of a chassis management module may be implemented. Node 1 201 and node 2 202 may be chassis management modules. Node 3 203 may be a shared storage node. Node 4 204 and node 5 205 may be general purpose computers or client processors. Node 6 206 and node 7 207 may be IPMI nodes. Each of those nodes 201-207 may be coupled to an IPMI network 200 with the shared storage node 203 coupled to each of the chassis management modules 201 and 202 separately from the coupling between the chassis management modules 201 and 202 for redundancy. Deterministic selection of a chassis management module may be implemented in the chassis management modules 201 and 202 and active chassis management information may be stored in the shared storage node 203.

The shared storage node 203 may include a processor, a data storage device and a network adaptor similar to the processor 154, storage device 156, and communications adaptor 162 discussed in connection with FIG. 2. The shared storage node 203 may operate as discussed in connection with the method of selecting a chassis management module 100 discussed in connection with FIG. 1. The data storage device may furthermore receive, contain and transmit information related to a last active chassis management module. The processor may receive the information related to the last active chassis management module from a chassis management module, store that information in the data storage device, and retrieve that information from the data storage device when requested to do so by a chassis management module. The network adaptor may transmit the information to and from the shared storage node 203.

While the systems, apparatuses, and methods of deterministic selection of a chassis management module have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A node activation method, comprising:
    reading an identifier from a shared storage node to determine an identified node, wherein the identifier is associated with a chassis management module node;
    activating the identified node if the identifier indicates that the identified node was previously active;
    if the identified node was not previously active, then selecting one of a plurality of nodes as active based on an address of the one of the plurality of nodes;
    writing an identifier, associated with the one of the plurality of nodes, to the shared storage node if the one of the plurality of nodes is not indicated by the identifier read from the shared storage node;
    rewriting the identifier of the one of the plurality of nodes to the shared storage node periodically if the identified node is initially active; and
    selecting the one of the plurality of nodes as active if the identifier of the one of the plurality of nodes remains in the shared storage node after a predetermined period of time and a last active node has not informed the one of the plurality of nodes that the last active node was active within the predetermined period of time.

2. The node activation method of claim 1, wherein a hardware device external to the one of the plurality of nodes determines the presence of network nodes and reports present network nodes to the one of the plurality of nodes.

3. The node activation method of claim 1, wherein re-writing the identifier of the one of the plurality of nodes to the shared storage node occurs after re-reading the identifier from the shared storage node and when the identifier from the shared storage node is not the identifier of the one of the plurality of nodes.

4. The node activation method of claim 1, further comprising communicating with the plurality of nodes that are coupled to the identified node and selecting an active node from among the plurality of nodes based on prior activity of the active node.

5. The node activation method of claim 1, wherein the plurality of nodes are coupled to a common network.

6. The node activation method of claim 1, wherein the identifier is a globally unique identifier.

7. The node activation method of claim 1, wherein the identifier is a system unique identifier.

8. The node activation method of claim 1, wherein the one of the plurality of nodes selected as initially active is a node having a lowest identifier value.

9. The node activation method of claim 1, wherein the one of the plurality of nodes selected as initially active is a node having a highest identifier value.

* * * * *